Patented Feb. 3, 1931

1,791,272

UNITED STATES PATENT OFFICE

CHARLES V. IREDELL, OF EAST ORANGE, NEW JERSEY, ASSIGNOR TO WESTINGHOUSE LAMP COMPANY, A CORPORATION OF PENNSYLVANIA

PROCESS IN RECOVERY OF REFRACTORY METALS FROM ORES

No Drawing.    Application filed December 7, 1928.   Serial No. 324,582.

This invention relates to the art of recovering metals from their ores and more particularly relates to the recovery of the so-called rare refractory metals from their silicate ores. Specifically this invention relates to a method of recovering the elements of the titanium, zirconium, hafnium group from their silicate ores.

Titanium silicate, titanium oxide (rutile) associated with silicates and silicon dioxide compounds of other metals and zirconium compounds of other metals and zirconium silicate (zircon) and other silicate and complex silicate compounds of the rare metals are highly refractory and difficultly reducible compounds. Various methods have been devised in the past for effecting the decomposition of these compounds, such as by fusion with alkaline hydroxides, alkali fluorides, alkali acid sulfates, etc., or by solution in hydrofluoric acid. Most of these methods are disadvantageous in commercial adaptation and most of them moreover provide an incomplete separation of the silicon content from the rare metal content of the compound. In addition thereto the majority of the processes are tedious, bulky, exacting as to conditions and laborious to operate and most of them require extensive equipment.

One of the objects of this invention is to provide an efficient, inexpensive, commercial method of effecting the decomposition of rare metal silicate ores.

Another object of this invention is to provide a simple, efficient inexpensive method of producing concentrates of rare metals from their ores.

Another object of this invention is to provide a process of separating rare metal compounds from silica compounds with which they may be associated.

Other objects and advantages may be seen as the invention is more fully disclosed.

In accordance with the above objects I have determined that rare metal carbides are substantially acid soluble and that silicon carbide is not. I have also determined that I may substantially effect a decomposition of naturally occurring or artificially prepared silicate compounds of the rare metals by a process which will be more fully disclosed to form rare metal carbides and silicon carbide. I have also determined that I may subject these carbide compounds to an acid digestion treatment and preferentially dissolve away from the silicon carbide all or substantially all of the rare metal compounds. Thereafter I may recover from the acid liquor the rare metal compounds by various well known chemical separation methods.

As a specific embodiment of the practice of my invention I will describe my invention as applied to the recovery of zirconium from its silicate ore, known in the art as zircon. Zirconium silicate or zircon is a highly refractory mineral and difficultly decomposable even by fusion methods. When so decomposed the silicon content is difficultly removed therefrom on account of the ready ease of formation of double compounds such as alkali zirconium silicates, etc., which resist further decomposition by the fusion agent. In addition, upon lixiviation of the fusion the silicon content is obtained in a form which is appreciably acid soluble and thereby carried over with the acid soluble zirconium content. By most of the prior methods of concentrating zirconium it is necessary in order to completely free the zirconium from such contaminating silica to convert the same to a fluoride compound and subsequently distill as volatile silicon tetrafluoride.

The present invention contemplates intimately admixing the finely comminuted silicate compound with carbon and subjecting the admixture to elevated temperatures whereby a decomposition of the zirconium silicate is obtained and zirconium carbide and silicon carbide is obtained. The method of heating is immaterial but the temperature of heating and the time of heating must be closely controlled.

I have found that conversion of the zircon of zirconium silicate may take place at any temperature above 1900° C. As this temperature may not readily be obtained by ordinary heating means I may utilize the arc furnace, the carbon resistance furnace, or the induction heating furnace of any of the well known types. I prefer to employ as the most practical furnace for large scale production the type of carbon resistor furnace wherein the charge comprised of a mixture of zircon and carbon, is made the resistor. Such a type furnace is employed in the manufacture of carborundum and fused alumina, and being of such a well known type and not being essentially a part of my invention, it need not be described by me.

The usual procedure I follow is to admix the zircon with a large excess of carbon, such as coke, lamp black, graphite, charcoal, etc., so as to render the same readily conductive. The lowest permissible limit of carbon for practical purposes appears to be approximately 40% and I have employed as high as 120%. Inasmuch as the true amount of carbon to be employed will depend in great measure upon the particular type of furnace employed, the fineness of subdivision of the materials of the charge, the length of the path the current must flow and other factors, it must be appreciated that the specific example of proportions herein described may be widely varied without essentially departing from the nature of my invention.

I then heat this admixture preferably by means of making the charge the resistor in a carbon resistance type furnace to a temperature between 1900° C. and 2500° C. for a period of time approximating one hour. The time interval may be varied depending upon the specific method of heating, size of charge, excess carbon, etc.

The following tests are representative of a large number which were made to establish the most suitable conditions for effecting the conversion of the zircon into zirconium carbide and silicon carbide.

| Approximate temperature ° C | Time | Atmosphere | Furnace | Soluble zirconium |
|---|---|---|---|---|
| 1000 | 3 hrs. | Ill. gas | Gas fired | No |
| 1700 | 2 hrs. | Hydrogen | Moly. wound | No |
| 2000 | 1 hr. | Ill. gas | Induction | Yes |
| 2000 | 30 min. | Ill. gas | Induction | Yes |
| 2200 | 1 hr. | Ill. gas | Induction | Yes |
| 2200 | 1 hr. | CO from charge | Induction | Yes |
| 2000 | 45 min. | Ill. gas | Carbon resistance | Yes |
| 2050 | 45 min. | Ill. gas | Carbon resistance | Yes |
| 2100 | 45 min. | Ill. gas | Carbon resistance | Yes |
| 2150 | 45 min. | Ill. gas | Carbon resistance | Yes |
| 2300 | 1 hr. | Ill. gas | Carbon resistance | Yes |
| 2450 | 1 hr. | Ill. gas | Carbon resistance | Yes |

In these test runs a large excess of carbon (approximately 120% theoretical) was employed to ensure the reaction according to the following equation going to completion:

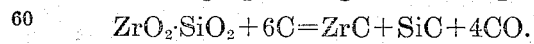
$$ZrO_2 \cdot SiO_2 + 6C = ZrC + SiC + 4CO.$$

As may be noted from these tests, I have preferred to employ a continuous flow of reducing gases through the furnace and it is preferable to employ reducing gases such as illuminating gases or carbon oxides. Due to the activity of hydrogen for carbon it is believed that this reducing gas may not be employed satisfactorily. However, relatively inert gases may be employed or the heating operation may be carried out in a substantial vacuo wherein the evolved carbon oxide from the reaction is removed in a continuous manner.

As may also be noted from these tests at all temperatures above 2000° C. the conversion of the zirconium content to carbide is effected and the higher temperatures need not necessarily be employed, but I have found that for the purpose of removing impurities such as iron and other associated impurities by volatilization the furnace temperature should be maintained at approximately 2200° C. The charge at this temperature becomes semi-fused.

At the conclusion of the furnace run the charge may be cooled and broken up to convenient size, crushed and pulverized to pass 100 mesh screen and subjected to an acid digestion treatment, which may be either hot or cold, dilute or concentrated; under pressure or in open vessels, dependent upon the desires of the operator. I have obtained good results in various ways but it is obvious that precautions should be taken to prevent hydrolysis or decomposition of the silicon carbide and consequent solution. The most simple and expedient method I have found is an acid digestion with nitric acid solution (approximately 1 part $HNO_3$ to 1 part $H_2O$) heated to approximately boiling in a steam jacketed porcelain lined kettle for a period of one hour or so. After allowing the solution to settle the clear supernatant liquor is decanted and the digestion repeated, as often as is required to effect entire decomposition of the zirconium carbide content. The residual silicon carbide and excess carbon may then be discarded and the decanted supernatant liquor separated by filtration from suspended semi-colloidal silicon carbides and other insoluble matter and the clear filtrate treated for the recovery of the zirconium content. If desired, it is obvious that the excess carbon content may be eliminated by any of the well known sedimentation methods prior to the acid digestion if desired.

Inasmuch as impurities such as associated group metals, titanium and hafnium, and heavy metals such as iron, manganese, chromium, etc. will be carried along in solution the subsequent separation must eliminate these impurities. The filtrate, however, and subsequently recovered rare metal compounds will be found to be relatively free from contaminating silica compounds and it will be substantially unnecessary to go through the usual fluoride method of removing silica therefrom.

Whereas I have specifically described my invention with respect to the recovery of zirconium from zirconium silicates, it is obvious that the invention may be equally as well applied to the recovery of titanium from titanium silicates, such as rutile or hafnium from hafnium silicate or it may be generally applied to difficulty decomposable silicate ores wherein the metal content thereof form carbides which may subsequently be decomposed or dissolved by acids.

All these modifications and applications are anticipated as may fall within the scope of the following claims.

What is claimed is:

1. The method of decomposing rare metal silicate ores which comprises heating said silicate ore with carbon to elevated temperatures sufficient to effect conversion of the silicon and the rare metal content to carbide compounds.

2. The method of decomposing rare metal ores, which comprises heating said ore with carbon to temperatures between 1900° C. and 2500° C.

3. The method of decomposing zirconium silicate which comprises admixing the finely pulverulent silicate compound with a large excess of carbon and heating said mixture to temperatures between 1900° and 2500° C.

4. The method of effecting the separation of rare metal compounds from associated silicon compounds which comprises converting both of said compounds to carbides by highly heating a mixture of said rare metal and silica compounds with carbon and thereafter dissolving the rare metal carbide away from the silicon carbide with acid.

5. The method of recovering the rare metals of the groups comprising zirconium, titanium, and hafnium from their silicate ores which comprises heating said ores with carbon to temperatures between 1900° and 2500° C. for a sufficient interval of time to effect conversion of the rare metal content and the silicon content to carbides and thereafter dissolving the rare metal carbide with acid.

6. The method of recovering zirconium from zircon which comprises admixing the ore with carbon in excess to that theoretically required to convert the zirconium and silicon to carbides heating said mixture to between 1900° C. to 2500° C. and thereafter dissolving away the zirconium carbide in acid.

7. The method of recovering zirconium from silicate ores which comprises heating a mixture comprised of the silicate ore and carbon in excess to about 2200° C. for a prolonged interval of time, cooling and crushing the mass to fine size, digesting the same with dilute nitric acid to effect decomposition of the zirconium carbide and solution as zirconium nitrate and thereafter filtering off the insoluble silicon carbide content of the mass.

In testimony whereof, I have hereunto subscribed my name this 4th day of December, 1928.

CHARLES V. IREDELL.